United States Patent
Reddy et al.

(10) Patent No.: US 10,841,103 B2
(45) Date of Patent: Nov. 17, 2020

(54) RELYING PARTY CERTIFICATE VALIDATION WHEN CLIENT USES RELYING PARTY'S IP ADDRESS

(71) Applicant: MICROSOFT TECHNOLOGY LICENSING, LLC, Redmond, WA (US)

(72) Inventors: Chandan R. Reddy, Redmond, WA (US); Kahren Tevosyan, Kirkland, WA (US); Hieu Trung Nguyen, Seattle, WA (US)

( * ) Notice: Subject to any disclaimer, the term of this patent is extended or adjusted under 35 U.S.C. 154(b) by 164 days.

(21) Appl. No.: 15/923,197

(22) Filed: Mar. 16, 2018

(65) Prior Publication Data
US 2019/0288859 A1 Sep. 19, 2019

(51) Int. Cl.
*H04L 29/06* (2006.01)
*H04L 9/32* (2006.01)
*H04L 29/12* (2006.01)

(52) U.S. Cl.
CPC .......... *H04L 9/3265* (2013.01); *H04L 9/3213* (2013.01); *H04L 9/3226* (2013.01); *H04L 9/3268* (2013.01); *H04L 61/1511* (2013.01); *H04L 63/0823* (2013.01)

(58) Field of Classification Search
CPC ... H04L 61/1511; H04L 9/3265; H04L 9/063; H04L 63/326; H04L 9/3213; H04L 9/3226; H04L 63/0823
USPC .......................................................... 726/9
See application file for complete search history.

(56) References Cited

U.S. PATENT DOCUMENTS

| 7,296,155 B1 * | 11/2007 | Trostle ................ H04L 63/1441 713/170 |
| 8,135,950 B2 * | 3/2012 | Parkinson ........... H04L 63/0428 713/156 |
| 8,191,109 B2 * | 5/2012 | Rhodes .................... G06F 21/31 726/3 |

(Continued)

OTHER PUBLICATIONS

Microsoft Corporation, [MS-MWBF]-v20160714 Microsoft Web Browser Federated Sign-On Protocol Copyright @ 2016, Microsoft Corporation. Release: Jul. 14, 2016. (Year: 2016), pp. 1-72.*

(Continued)

*Primary Examiner* — Michael S McNally
(74) *Attorney, Agent, or Firm* — Shook, Hardy & Bacon, LLP (57) ABSTRACT

Aspects of the technology described herein enable a client device to access a web service in a claims-based identity environment thorough an Internet Protocol (IP) address, rather than the web service's domain name service (DNS). In a claims-based identity environment, a client device will authenticate a relying party's server SSL certificate before providing the token to the relying party by following an authentication process. Current authentication processes include a name-chaining operation, which compares a subject field of a token provided with the Uniform Resource Identifier (URI) used to request the resource (e.g., RP application). When the IP address is used as the URI, then the URI in the certificate will not match the URI in the request and the authentication will fail. Accordingly, aspects of the technology use an alternative authentication method that allows access to a web service through an IP address, when the default client-side token validation is DNS-name based.

20 Claims, 5 Drawing Sheets

(56) References Cited

U.S. PATENT DOCUMENTS

| | | | |
|---|---|---|---|
| 9,369,427 B2* | 6/2016 | Gould | H04L 61/1511 |
| 9,384,097 B2* | 7/2016 | Waldron | G06F 11/1451 |
| 2007/0204168 A1 | 8/2007 | Cameron et al. | |
| 2008/0289019 A1* | 11/2008 | Lam | G06F 21/41 |
| | | | 726/9 |
| 2013/0151847 A1 | 6/2013 | Sinha | |
| 2014/0189808 A1* | 7/2014 | Mahaffey | H04L 63/083 |
| | | | 726/4 |

OTHER PUBLICATIONS

Tanenbaum, Andrew S.; "Structured Computer Organization"; Prentice-Hall, Inc.; 1990; Third Edition; pp. 11-13. (Year: 1990), p. 8.*

R. Housley RSA Laboratories; W. Polk NIST; W. Ford VeriSign; D. Solo Citigroup, Internet X.509 Public Key Infrastructure (Year: 2002) available at https://tools.ietf.org/html/rfc3280; pp. 16, 34-35.*

Corporation, Microsoft, et al., "An Implementer's Guide to the Identity Selector Interoperability Profile V1.5", Retrieved from: https://www.microsoft.com/en-us/download/details.aspx?id=18221, Jul. 1, 2008, 83 Pages.

Nanda, et al., "Identity Selector Interoperability Profile V1.5", Retrieved From: https://www.microsoft.com/en-us/download/details.aspx?id=18221, Jul. 1, 2008, 60 Pages.

"International Search Report and Written Opinion Issued in PCT Application No. PCT/US19/021507", dated May 23, 2019, 14 Pages.

* cited by examiner

RELYING PARTY CERTIFICATE VALIDATION WHEN CLIENT USES RELYING PARTY'S IP ADDRESS

BACKGROUND

Generally, security policies can be used by web services and client devices to authenticate each other. For example, a web service can follow a procedure to authenticate a client before granting access to particular resources. Similarly, the client can authenticate the web service prior to accessing the web service. These polices are effective when typical access and communication processes are followed. For example, a client may have an authentication procedure predicated on accessing a web service using the domain name system (DNS). The authentication procedures may fail when alternative access methods are followed.

SUMMARY

Aspects of the technology described herein enable a client device to access a web service in a claims-based identity environment thorough an Internet Protocol (IP) address, rather than the web service's domain name service (DNS). A claims-based identity environment uses claims to validate a user identity. The claims include the information an application needs to validate a user and understand the user's permissions.

In a typical usage scenario involving a web service, when a client requests access to a relying party (RP) application, the RP application does not authenticate the client directly. Instead, the application redirects the client to the security token service (STS), which in turn authenticates the user of the client application and grants the client a security token.

In a claims-based identity environment, a client device will authenticate a relying party's server Secure Sockets Layer (SSL) certificate before providing the token to the relying party by following an authentication process. Current authentication processes include a name-chaining operation, which compares a subject field or subject alternate name (SAN) of relying party's server SSL certificate with the Uniform Resource Identifier (URI) used to request the resource (e.g., RP application). Because the default URI is a DNS, the relying party's server SSL certificate will show a DNS name of the requested web service in the subject field or a subject alternate name (SAN). Generally, the IP address will not be included. When the IP address is used as the URI, then the URI in the certificate will not match the subject field or the subject alternate name (SAN) of relying party's certificate and the authentication will fail. Accordingly, aspects of the technology use an alternative authentication method that allows access to a web service through an IP address, when the default client-side token validation is DNS-name based.

BRIEF DESCRIPTION OF THE DRAWINGS

The present invention is described in detail below with reference to the attached drawing figures, wherein.

DETAILED DESCRIPTION

Overview

Aspects of the technology described herein enable a client device to access a web service in a claims-based identity environment thorough an Internet Protocol (IP) address, rather than the web service's domain name service (DNS). A claims-based identity environment uses claims to validate a user identity. The claims include the information an application needs to validate a user and understand the user's permissions.

In a typical usage scenario involving a web service, when a client requests access to a relying party application, the RP application does not authenticate the client directly. Instead, the application redirects the client to the STS, which in turn authenticates the user of the client application and grants the client a security token. The token includes data records that include multiple elements used for validation. The client then presents the token to the RP application to gain access to the resources provided by the RP application. However, before presenting the token, the client validates the RP, using a process such as Public Key Infrastructure (PKI) chain validation. Commonly used PKI chain validation process uses name chaining as one of several validation steps. The name-chaining validation fails when the initial request goes to a Uniform Resource Identifier (URI) different from the URI provided by the STS in the token.

Public Key Infrastructure (PKI) chain validation comprises performing a series of steps to authenticate a token. If any one step fails, then the token authentication will fail. Of particular importance to the technology described herein, in a claims-based identity environment, a client device will authenticate a server SSL certificate for web service before providing the token to the relying party following an authentication process. Current authentication processes include a name-chaining operation, which compares a subject field or a subject alternate name (SAN) of relying party's server SSL certificate with the Uniform Resource Identifier (URI) used to request the resource (e.g., RP application). Name chaining is one aspect of a client authentication process of a web service. The name-chaining process compares the value of the subject field in a web service certificate to the Uniform Resource Identifier (URI) used to contact the service. In order to pass the name-chaining test, the name in both must match. For example, if the URI of the service is "http://www.abc.com/" then the subject field in the server certificate must also contain the value "www.abc.com".

Because the default URI is a DNS, the relying party's server SSL certificate will show a DNS name of the requested web service in the subject field or a subject alternate name (SAN). Generally, the IP address will not be included in the certificate. When the IP address is used as the URI, then the URI in the certificate will not match the URI in the request and the authentication will fail. Accordingly, aspects of the technology use an alternative authentication method that allows access to a web service through an IP address, when the default client-side validation is DNS-name based.

Definitions

Audience URI: a value within the security token that specifies who the assertion is intended for. The "audience" will be the relying party and is typically a URL but can be formatted as any string of data. The audience URI can be found in security tokens formatted according to Security Assertion Markup Language (SAML) 1.1 or SAML 2.0.

Claim: A declaration made by an entity (for example, name, identity, key, group, privilege, and capability).

DNS name: A fully qualified domain name (FQDN).

Domain naming service name: The fully qualified domain name (FQDN) as known by the Domain Name System (DNS).

Relying party (RP): A web application or service that consumes security tokens issued by a security token service (STS).

Requestor IP/STS: An IP/STS in the same security realms as the web browser requestor. The requestor IP/STS has an existing relationship with the user that enables it to issue security tokens containing user information.

Resource IP/STS: An IP/STS in the same security realm as the web service (WS) resource. The resource IP/STS has an existing relationship with the WS resource that enables it to issue security tokens that are trusted by the WS resource.

Subject Name: A field in the SSL Certificate that identifies the fully qualified domain name (FQDN) or name that you want to use to access the website and its corresponding SSL Certificate. The subject name can also be described as the common name of the SSL certificate.

Subject Alternative Name (SAN): A field in the SSL Certificate that acts as an extension of the common name and allows you to associate more than one common name with the SSL Certificate.

Secure Sockets Layer Certificate: Is a digital certificate that certifies the ownership of a public key by the named subject of the certificate. The SSL certificate may follow the X.509 standard.

Security token service (STS): A web service that issues security tokens. That is, it makes assertions based on evidence that it trusts; these assertions are for consumption by whoever trusts it.

Signature: A value computed with a cryptographic algorithm and bound to data in such a way that intended recipients of the data can use the signature to verify that the data has not been altered and/or has originated from the signer of the message, providing message integrity and authentication. The signature can be computed and verified either with symmetric key algorithms, where the same key is used for signing and verifying, or with asymmetric key algorithms, where different keys are used for signing and verifying (a private and public key pair are used).

Security token: A collection of one or more claims. Specifically in the case of mobile devices, a security token represents a previously authenticated user Trust: The characteristic that one entity is willing to rely on a second entity to execute a set of actions and/or to make a set of assertions about a set of subjects and/or scopes.

User: A person who employs a web browser requestor or other client application to access a web service (WS) resource.

User principal name (UPN): A user account name (sometimes referred to as the user logon name) and a domain name that identifies the domain in which the user account is located. The format is: someone@example.com (in the form of an email address).

Web browser requestor: An HTTP web browser client that transmits protocol messages between an IP/STS (or other entity) and a relying party.

Web service (WS) resource: A destination HTTP web application or an HTTP resource serviced by the application. The WS refers to the application or manager of the resource that receives identity information and assertions issued by an IP/STS. The WS resource is a relying party.

Service Certificates: Service certificates have the primary task of authenticating the server to clients. One of the initial checks when a client authenticates a server is to compare the value of the subject field to the Uniform Resource Identifier (URI) used to contact the service: the DNS of both must match. For example, if the URI of the service is "http://www.abc.com/webservice1/" then the subject field must also contain the value "www.abc.com". Note that the subject field can contain several values, each prefixed with an initialization to indicate the value. Most commonly, the initialization is "CN" for common name, for example, "CN=www.cabc.com". It is also possible for the subject field to be blank, in which case the Subject Alternative Name field can contain the DNS name value. Also note the value of the Intended Purposes field of the certificate should include an appropriate value, such as "Server Authentication" or "Client Authentication".

Example Claim-Based Identity Environment

Figure 1:
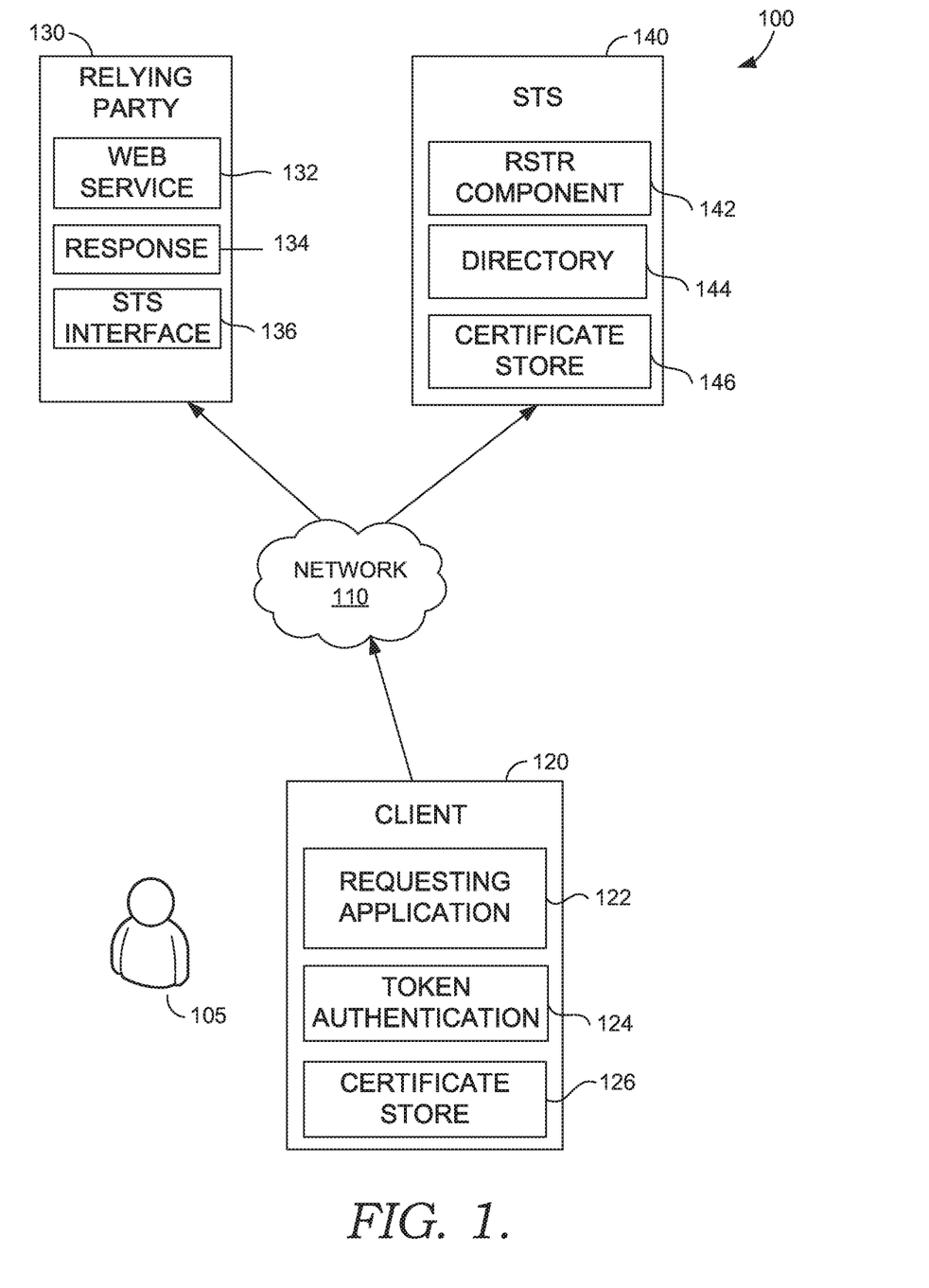
FIG. 1 is a block diagram of a relying party environment, in accordance with aspects of the technology described herein.

Turning now to FIG. 1, an exemplary claim-based identity environment 100 is shown, according to an aspect of the technology described herein. Among other components not shown, the claim-based identity environment 100 includes a client device 120, and relying party server (RP) 130, and a security token service (STS) 140, all connected by computer network 110. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Each of the components shown in FIG. 1 may be implemented via any type of computing device, such as computing device 500 described in connection to FIG. 5. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

The client device is on the client-side of operating environment 100, while the STS 140 and RP server 130 can be on the server-side of environment 100. Client device 120 may comprise any type of computing device capable of use by a user 105. By way of example and not limitation, a client device 120 may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Figure 5:
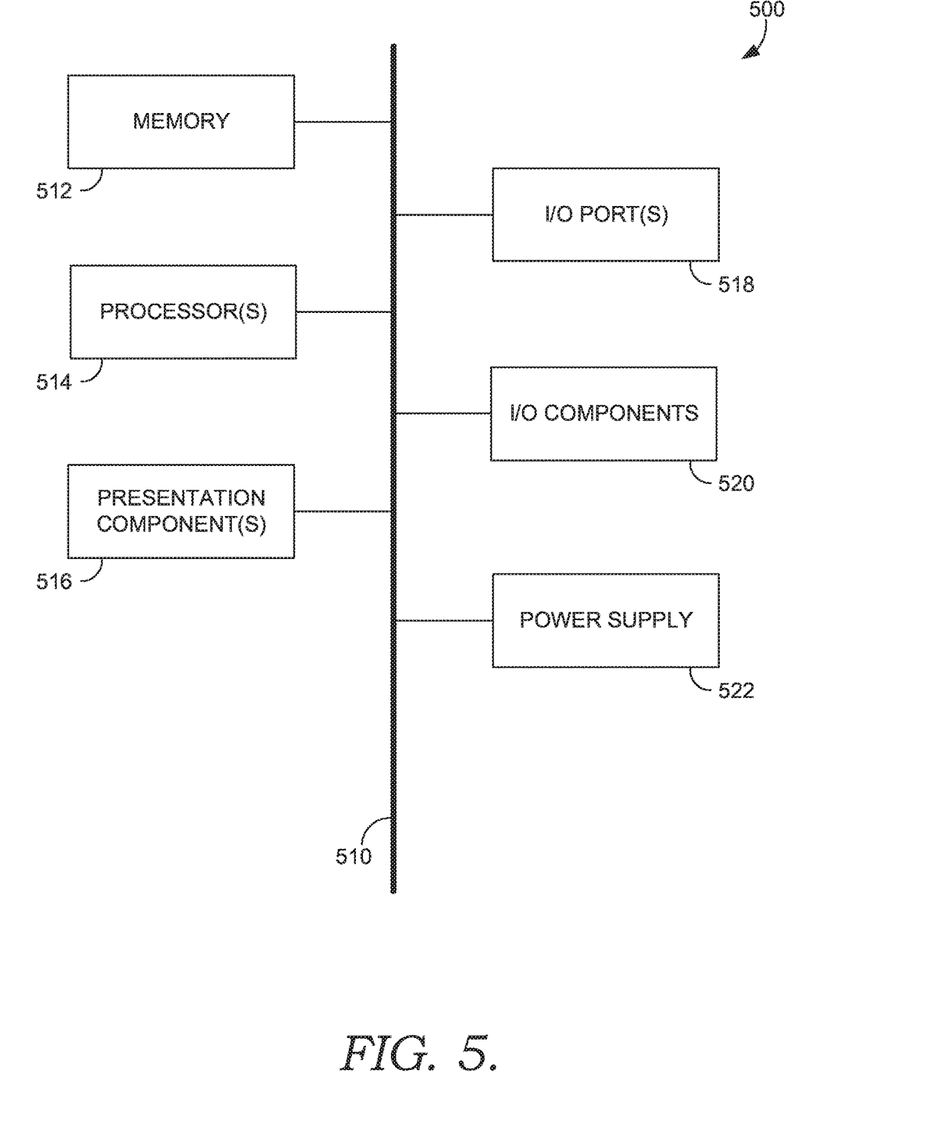
FIG. 5 is a block diagram of an example computing environment suitable for use in implementing aspects of the technology described herein.

Environment 100 includes network 110, which communicatively couples components of system 100 including client device 120 (including its components 122, 124, and 126), RP server 130 (including its components 132, 134, and 136), and STS 140 (including its components 142, 144, and 146) may be embodied as a set of compiled computer instructions or functions, program modules, computer software services, or an arrangement of processes carried out on one or more computer systems, such as computing device 500 described in connection to FIG. 5.

Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example system 100, it is contemplated that in some aspects functionality of these components can be shared or distributed across other components.

The requesting application 122 is a claims-aware application, such as a web browser. The client device 120 comprises requesting application 122, token authentication component 124, and certificate store 126. The Windows Identity Foundation (WIF) is a set of .NET Framework classes used to build claims-aware applications. Among other things, it provides the logic used to process WS-Federation requests. The WS-Federation protocol builds on other standard protocols such as WS-Trust and WS-Security. WS-Trust introduces protocol mechanisms independent of any particular application for requesting, issuing, renewing, cancelling and validating security tokens which can be exchanged to authenticate principals and protect resources. An aspect of this protocol is the request-response message pair comprising a Request Security Token (RST) message and a Request Security Token Response (RSTR) message.

The requesting application 122 requests authentication procedures from RP server 130 and then follows them to get a security token from the STS 140. The request for a token can be an RST message.

The token authentication component 124 authenticates an SSL certificate received from the STS. The SSL certificate can validate the RP in the eyes of the requesting application 122. The SSL certificate is validated using Public Key Infrastructure (PKI) chain validation through a secondary authentication process. A step in the secondary authentication process comprises comparing a DNS name from an audience Uniform Resource Identifier (URI) field in the security token with a subject field in the certificate for the relying party. The validation of the token can be by a security token handler, such as a handler adapted to evaluate a token formatted according to Security Assertion Markup Language (SAML) 1.1 or SAML 2.0. In this case, the audience URI field will include the RP's IP address. Because the IP address was used to access the RP, the audience URI field will match the URI used to access the RP and the validation will be successful. Validating against the audience URI filed contrasts with validating against the subject field or the SAN field.

As part of the PKI validation, a chain between a certificate trusted by the requesting application 122 and the SSL certificate is authenticated. The SSL certificate may not be directly trusted or known by the requesting application 122. Accordingly, the STS can include a chain of certificates that includes a trusted certificate issued by a certificate authority (CA). In essence, the known certificate issued by the CA vouches for the authenticity of the other certificates in the chain.

The certificate store 126 includes one or more trusted certificates. In one aspect, the trusted certificates are issued by one or more CAs. These trusted certificates are used as part of the SSL certificate validation process.

The RP server 130 comprises a web service 132, a response component 134, and an STS interface 136. The web service 132 provides a service to the requesting application 122. Access to the web service 132 requires authentication of the user of the requesting application 122.

The response component 134 responds to a request for authentication information from a requesting application. The response includes authentication metadata that includes an address (e.g., DNS name) for the STS 140 trusted by the RP server 130. The requesting application 122 uses the information in the response to generate a request for a security token.

The STS interface 136 establishes trust with the STS 140 and provides user authentication information to the STS 140. Alternatively, the STS interface 136 provides instructions for the STS 140 to access user authentication information. The user authentication information can include user names and passwords. The user authentication information is used by the STS 140 to authenticate users on behalf of the RP server 130.

The STS 140 includes request security token response (RSTR) component 142, user directory 144, and STS certificate store 146. The STS 140 validates users on behalf of the RP server 130. Upon receiving a RST message from the requesting application 122, the STS 140 validates the user, including by asking for a password or other information. The RSTR component 142 generates an RSTR message that includes a security token the requesting application 122 can present to the relying party for access. The RSTR message also includes an SSL certificate for the relying party.

The user directory 144 stores user authentication information for the RP server 130. The user directory 144 can be remote from the STS 140.

The STS certificate store 146 stores security certificates that are provided in the RSTR message upon validation of the user credentials.

Figure 2:
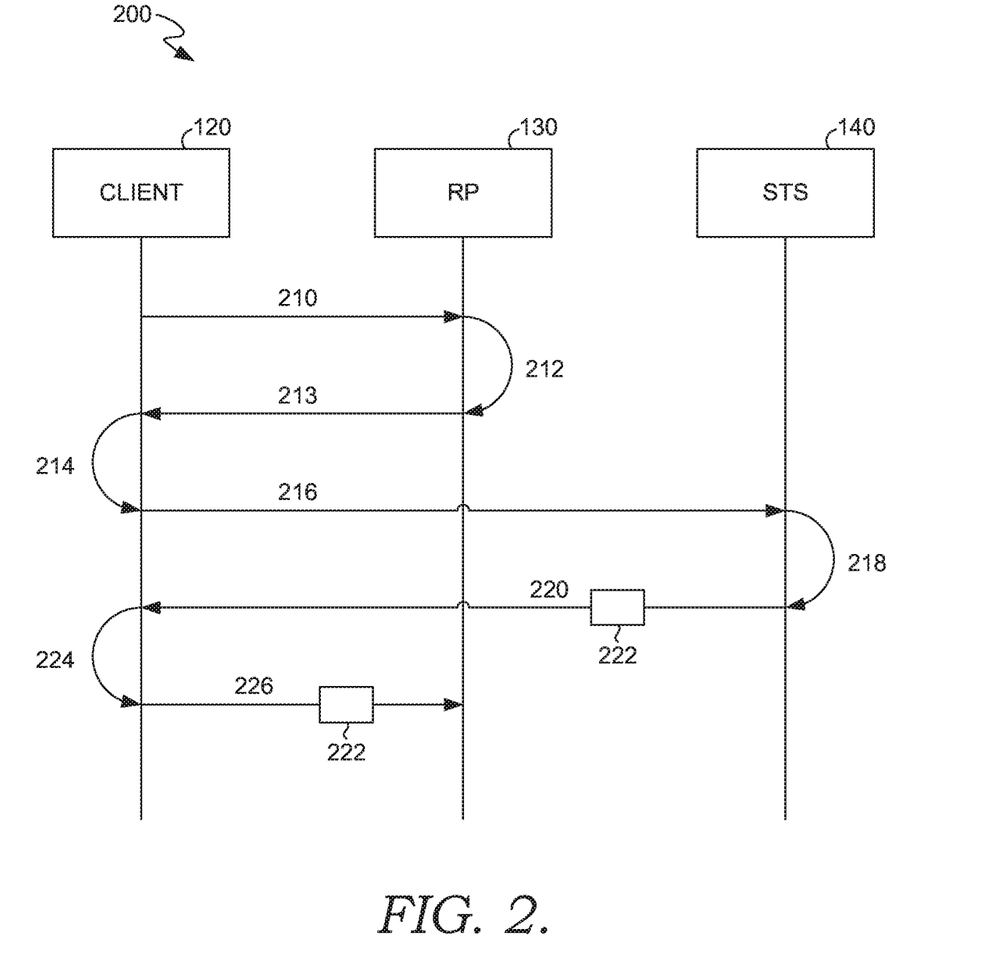
FIG. 2 is sequence diagram showing a method of authenticating a user's identity, in accordance with aspects of the technology described herein.

Turning now to FIG. 2, a method 200 of authenticating a user of a client device is provided, in accordance with aspects of the technology described herein. The client device 120, relying party server 130, and STS 140 have been described previously with reference to FIG. 1. As described previously, these components can be connected by a computer network, such as network 110 described previously.

Initially, an access request is sent 210 from a client application, such as a web browser running on the client device 120, to a Uniform Resource Identifier (URI) of a relying party 130. The request can ask the relying party 130 to provide authentication instructions. The URI of the RP is an Internet Protocol (IP) address of the relying party, instead of the domain name service (DNS) name for the relying party. In a claims-based identity environment, the DNS name is the default URI for accessing the relying party 130. An administrator or some other user may use the IP address, instead of the DNS name, when the DNS name is not available, such as during testing, during a recovery, or some other situation. Accordingly, the default user authentication process uses the DNS name. An alternative authentication process is needed when the IP address is used.

The client application could be a web browser or other claims aware application. The Windows Identity Foundation (WIF) is a set of .NET Framework classes used to build claims-aware applications. Among other things, it provides the logic used to process WS-Federation requests. The WS-Federation protocol builds on other standard protocols such as WS-Trust and WS-Security. WS-Trust introduces protocol mechanisms independent of any particular application for requesting, issuing, renewing, cancelling and validating security tokens which can be exchanged to authenticate principals and protect resources. An aspect of this protocol is the request-response message pair comprising a Request Security Token (RST) message and a Request Security Token Response (RSTR) message.

The relying party 130 does not perform user authentication. Instead, the relying party 130 relies on a security token service (STS) 140 to authenticate users. Prior to method 200, the relying party 130 establishes a trust relationship with one or more STSs and provides information about authorized users to the STS or a way to access user information, if stored elsewhere. The information can include authentication information, such as email addresses, user names, passwords, biometric IDs, and such. The STS 140 will use this information to authenticate the user.

The relying party 130 receives the request and generates 212 a response comprising authentication instructions, including a DNS name of a security token service (STS) trusted by the relying party, a security realm/DNS name of the relying party, and possibly other authentication metadata. The response is then sent 213 to the client 120.

The client application receives 214 the response from the relying party 130. As mentioned, the response includes authentication metadata that includes an address (e.g., DNS name) for the security token service (STS) trusted by the relying party. The client application uses the information in the response to generate a request for a security token.

At step 216, the request for a security token to access the relying party is sent to the STS. The request may include claims about the identity of the user, permissions the user may have, a role of the user, and such. The request can be a RST message when the WS-Trust protocol is being used.

At step 218, the STS authenticates the user's claims and generates a security token 222 that demonstrates to the relying party that the user's identity has been authenticated. The authentication can comprise asking the user to provide a password for the RP service or some other method. The response can be a RSTR message when the WS-Trust protocol is being used. The security token provided can be formatted according to formatted according to Security Assertion Markup Language (SAML) 1.1 or SAML 2.0. The security token can include the IP address of the relying party in audience URI field.

The client 120 application receives 220 the security token to access the relying party from the STS 140. The security token comprises a SSL certificate for the relying party.

At step 224, the SSL certificate is validated using Public Key Infrastructure (PKI) chain validation through a secondary authentication process. A step in the secondary authentication process comprises comparing a DNS name from an audience Uniform Resource Identifier (URI) field in the security token with a subject field in the certificate for the relying party. The validation of the token can be by a security token handler, such as a handler adapted to evaluate a token formatted according to Security Assertion Markup Language (SAML) 1.1 or SAML 2.0. In this case, the audience URI field will include the RP's IP address. In one aspect, the audience field will also include URL of the relying party. Because the IP address was used to access the RP, the audience URI field will match the URI used to access the RP and the validation will be successful. Validating against the audience URI filed contrasts with validating against the subject field or the SAN field.

In one aspect, the secondary authentication process is selected from a plurality of available authentication processes, including a primary authentication process. Initially, a determination may be made that the request is addressed to an Internet Protocol (IP) address of the relying party rather than a domain name service (DNS) name. In response to this determination, the secondary authentication process is selected, rather than a primary authentication process that compares the subject field or the SAN of the SSL certificate for the relying party with the URI of the relying party used in the request. In other words, the secondary authentication processes can be designated for use when the IP address of the RP is the URI used by the client application.

Upon successful validation of the security token, the security token 222 is communicated 226 to the relying party. The relying party then validates the security token 222 and grants access to the requested resources.

Figure 3:
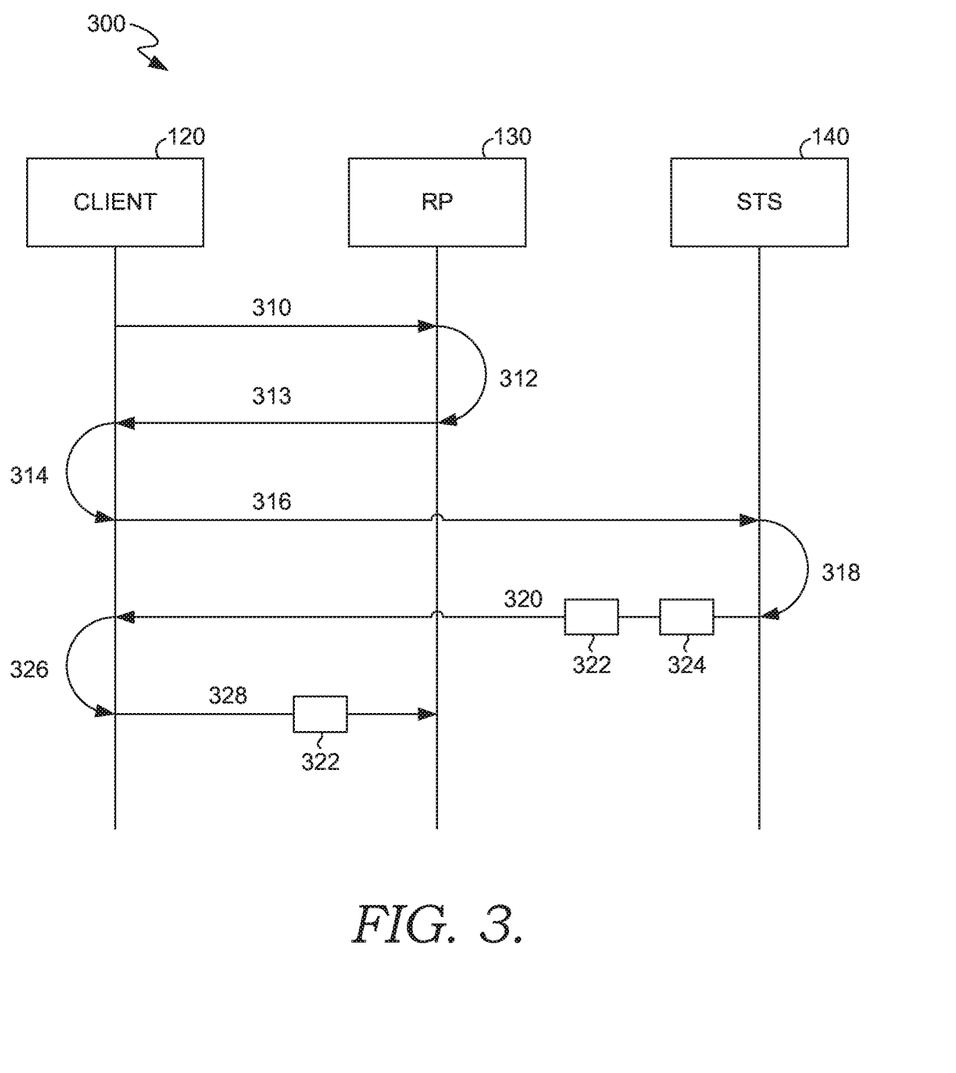
FIG. 3 is sequence diagram showing a method of authenticating a user's identity, in accordance with aspects of the technology described herein.

Turning now to FIG. 3, a method 300 of authenticating a user of a client device is provided, in accordance with aspects of the technology described herein. The client device 120, relying party server 130, and STS 140 have been described previously with reference to FIG. 1. As described previously, these components can be connected by a computer network, such as network 110 described previously.

Initially, an access request is sent 310 from a client application, such as a web browser, to a Uniform Resource Identifier (URI) of a relying party 130. The URI is an Internet protocol (IP) address of the relying party, instead of the domain name service (DNS) name for the relying party. In a claims-based identity environment, the DNS name is the default URI for accessing the relying party 130. An administrator or some other user may use the IP address, instead of the DNS name, when the DNS name is not available, such as during testing, during a recovery, or some other situation. Accordingly, the default user authentication process incorporates the DNS name. An alternative authentication process is needed when the IP address is used. The request can ask the relying party 130 to provide authentication instructions.

The relying party does not perform user authentication. Instead, the relying party 130 relies on a security token service (STS) 140 to authenticate users. Prior to method 300, the relying party establishes a trust relationship with one or more STSs and provides information about authorized users to the STS or a way to access user information, if stored elsewhere. The information can include authentication information, such as email addresses, user names, passwords, biometric IDs, and such.

The relying party 130 receives the request and generates 312 a response comprising authentication instructions, including a DNS name of a security token service (STS) trusted by the relying party, a security realm/DNS name of the relying party, and possibly other authentication metadata. The response is then sent 313 to the client 120.

The client application receives 314 the response from the relying party 130. As mentioned, the response includes authentication metadata that includes an address (e.g., DNS name) for a security token service (STS) trusted by the relying party. The client application uses the information in the response to generate a request for a security token.

At step 316, the request for a security token to access the relying party is sent to the STS. The request may include claims about the identity of the user, permissions the user may have, a role of the user, and such. The request can be a RST message when the WS-Trust protocol is being used.

At step 318, the STS authenticates the user's claims and generates a security token 322 that demonstrates to the relying party that the user's identity has been authenticated. The response can be a RSTR message when the WS-Trust protocol is being used. The STS can provide a security token 322 and a public certificate 324 for the relying party.

At step 320, the security token 322 and a public certificate 324 for the relying party are received by the client 120 from the STS. The security token comprises a SSL certificate for the relying party.

At step 326, the SSL certificate 322 is validated through an authentication process that comprises comparing the SSL certificate for the relying party and the public certificate 324 for the relying party. The authentication process can be a secondary process, rather than a default process.

In one aspect, a determination is made that the URI of the relying party does not match the subject field in the SSL certificate for the relying party. Under a default authentication process this would cause a validation failure. Upon detecting the mismatch, a second determination is made that the request is addressed to an Internet protocol (IP) address rather than a DNS name. In response to the second determination, the authentication process is used rather than the default authentication process that requires the URI of the relying party to match the subject field or subject alternative name (SAN) in the SSL certificate for the relying party.

At step 328, upon successful validation of the security token, the security token 322 is communicated from the client 120 to the relying party 130.

Example Distributed Computing Environment

Figure 4:
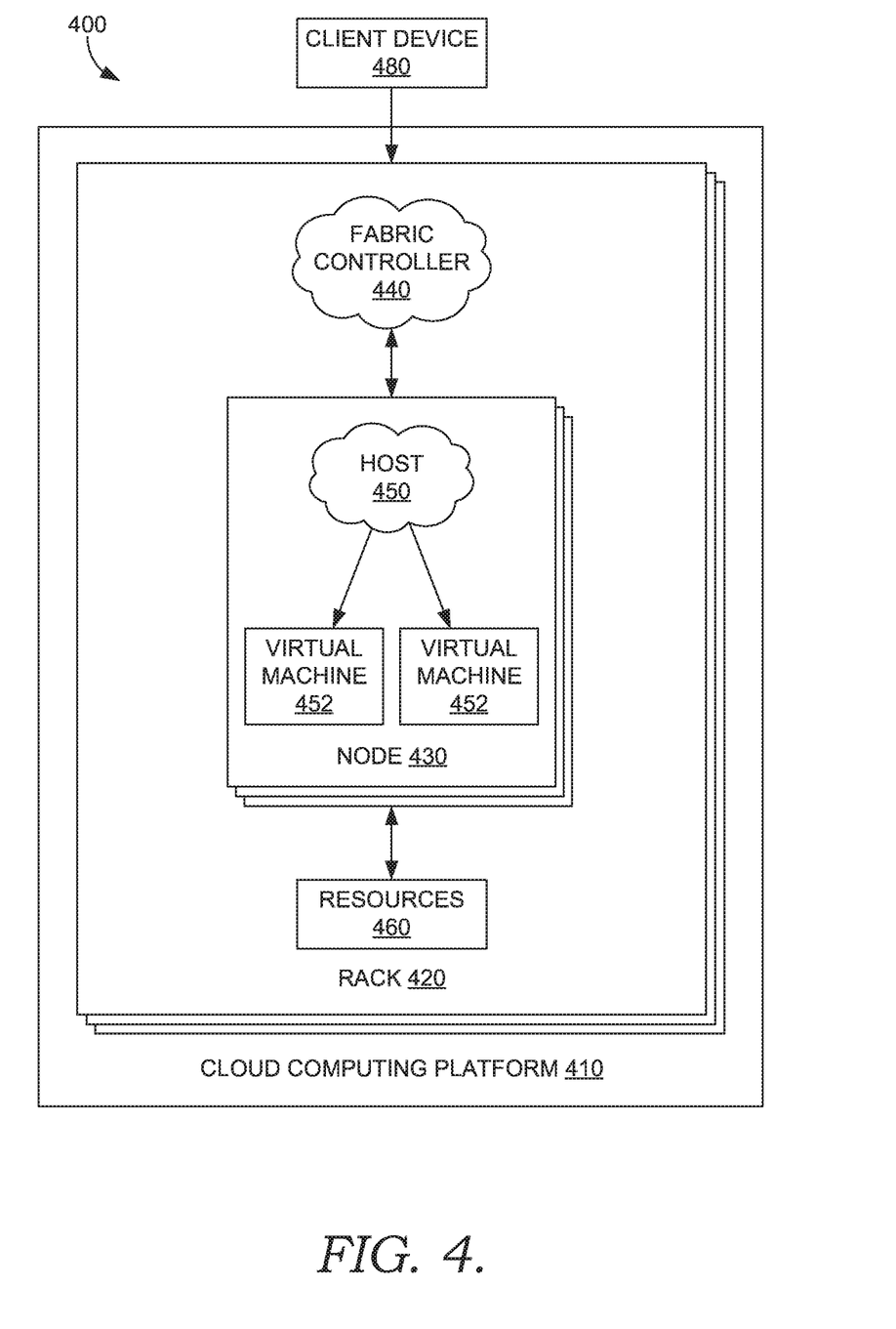
FIG. 4 is a block diagram of an example distributed computing environment suitable for use in implementing aspects of the technology described herein.

Referring now to FIG. 4, FIG. 4 illustrates an example distributed computing environment 400 in which implementations of the present disclosure may be employed. In particular, FIG. 4 shows a high level architecture of the secrets management system ("system") in cloud computing platform 410, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e g , machines, interfaces, functions, orders, and groupings of functions, etc.) can be used in addition to or instead of those shown.

Data centers can support distributed computing environment 400 that includes cloud computing platform 410, rack 420, and node 430 (e.g., computing devices, processing units, or blades) in rack 420. The system can be implemented with cloud computing platform 410 that runs cloud services across different data centers and geographic regions. Cloud computing platform 410 can implement fabric controller 440 component for provisioning and managing resource allocation, deployment, upgrade, and management of cloud services. Typically, cloud computing platform 410 acts to store data or run service applications in a distributed manner Cloud computing infrastructure 410 in a data center can be configured to host and support operation of endpoints of a particular service application. Cloud computing infrastructure 410 may be a public cloud, a private cloud, or a dedicated cloud.

Node 430 can be provisioned with host 450 (e.g., operating system or runtime environment) running a defined software stack on node 430. Node 430 can also be configured to perform specialized functionality (e.g., compute nodes or storage nodes) within cloud computing platform 410. Node 430 is allocated to run one or more portions of a service application of a tenant. A tenant can refer to a customer utilizing resources of cloud computing platform 410. Service application components of cloud computing platform 410 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 430, nodes 430 may be partitioned into virtual machines (e.g., virtual machine 452 and virtual machine 454). Physical machines can also concurrently run separate service applications. The virtual machines or physical machines can be configured as individualized computing environments that are supported by resources 460 (e.g., hardware resources and software resources) in cloud computing platform 410. It is contemplated that resources can be configured for specific service applications. Further, each service application may be divided into functional portions such that each functional portion is able to run on a separate virtual machine. In cloud computing platform 410, multiple servers may be used to run service applications and perform data storage operations in a cluster. In particular, the servers may perform data operations independently but exposed as a single device referred to as a cluster. Each server in the cluster can be implemented as a node.

Client device 480 may be linked to a service application in cloud computing platform 410. Client device 480 may be any type of computing device, which may correspond to computing device 400 described with reference to FIG. 4, for example Client device 480 can be configured to issue commands to cloud computing platform 410. In embodiments, client device 480 may communicate with service applications through a virtual Internet Protocol (IP) and load balancer or other means that direct communication requests to designated endpoints in cloud computing platform 410. The components of cloud computing platform 410 may communicate with each other over a network (not shown), which may include, without limitation, one or more local area networks (LANs) and/or wide area networks (WANs).

Example Computing Environment

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output ports 518, input/output components 520, and illustrative power supply 522. Bus 510 represents what may be one or more buses (such as an address bus, data bus, or combination thereof). The various blocks of FIG. 5 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

With reference to the autonomous secrets management system, embodiments described herein support autonomous renewal and distribution of secrets. The autonomous secrets management system components refer to integrated components for autonomous renewal and distribution of secrets. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the autonomous secrets management system can include an API library that includes specifications for routines, data structures, object classes, and variables may support the interaction between the hardware architecture of the device and the software framework of the autonomous secrets management system. These APIs include configuration specifications for the autonomous secrets management system such that the different components therein can communicate with each other in the autonomous secrets management system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous secrets management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for authenticating a user, the method comprising:
    sending, from a client application, an access request to a Uniform Resource Identifier (URI) of a relying party, wherein URI is an Internet Protocol (IP) address of the relying party, and wherein a default URI for the relying party is a domain name service (DNS) name;
    receiving, at the client application, a response from the relying party that includes authentication metadata that includes an address for a security token service (STS) trusted by the relying party;
    sending, from the client application, a request for a security token to access the relying party to the STS;
    receiving, at the client application, the security token to access the relying party from the STS, wherein the security token comprises a certificate for the relying party;
    validating the certificate using Public Key Infrastructure (PKI) chain validation through a secondary authentication process, wherein a step in the secondary authentication process comprises comparing a DNS name from an audience Uniform Resource Identifier (URI) field in the security token with a subject field or subject alternative name (SAN) field in the certificate for the relying party; and
    upon successful validation of the security token, communicating, from the client application, the security token to the relying party.

2. The method of claim 1, wherein the certificate is a Secure Sockets Layer (SSL) certificate.

3. The method of claim 1, wherein the authentication metadata also includes a security realm of the relying party.

4. The method of claim 1, wherein the security token comprises a claim for the user of the client application.

5. The method of claim 1, wherein the client application is a web browser.

6. The method of claim 1, wherein the method further comprises:
    determining that the request is addressed to an Internet Protocol (IP) address of the relying party rather than a domain name service (DNS) name; and
    in response to said determining, using the secondary authentication process rather than a primary authentication process that compares the subject field or the SAN of the certificate for the relying party with the URI of the relying party used in the request.

7. The method of claim 1, wherein the method further comprises:

determining that the URI of the relying party does not match the subject field or SAN in the certificate for the relying party;

determining that the request is addressed to an Internet Protocol (IP) address rather than a DNS name; and using the secondary authentication process rather than a primary authentication process that compares the subject field of the certificate for the relying party with the URI of the relying party used in the request.

8. One or more computer storage media storing computer-useable instructions that, when used by one or more computing devices, cause the one or more computing devices to perform operations comprising:

sending, from a client application, an access request to a Uniform Resource Identifier (URI) of a relying party, wherein URI is an Internet Protocol (IP) address of the relying party, and wherein a default URI for the relying party is a domain name service (DNS) name;

receiving, at the client application, a response from the relying party that includes authentication metadata that includes an address for a security token service (STS) trusted by the relying party;

sending, from the client application, a request for a security token to access the relying party to the STS;

receiving, at the client application, the security token to access the relying party from the STS, wherein the security token comprises a certificate for the relying party;

validating the security token using Public Key Infrastructure (PKI) chain validation through an authentication process, wherein a step in the authentication process comprises comparing a DNS name from an audience Uniform Resource Identifier (URI) field in the security token with a subject field or subject alternative name (SAN) in the certificate for the relying party; and upon successful validation of the security token, communicating, from the client application, the security token to the relying party.

9. The media of claim 8, wherein the authentication process does not include a step of comparing the Internet Protocol (IP) address of the relying party to the subject field in the certificate for the relying party.

10. The media of claim 8, wherein the method further comprises:

determining that the URI of the relying party does not match the subject field in the certificate for the relying party;

determining that the request is addressed to an Internet protocol (IP) address rather than a DNS name; and using the authentication process rather than a default authentication process that requires the URI of the relying party to match the subject field or the SAN in the certificate for the relying party.

11. The media of claim 8, wherein the relying party provides a web service.

12. The media of claim 8, wherein the authentication metadata also includes a security realm of the relying party.

13. The media of claim 8, wherein the certificate is a Secure Sockets Layer (SSL) certificate.

14. The media of claim 8, wherein the security token comprises a claim for a user of the client application.

15. A method for authenticating a user, the method comprising:

sending, from a client application, an access request to a Uniform Resource Identifier (URI) of a relying party, wherein URI is an Internet Protocol (IP) address of the relying party, and wherein a default URI for the relying party is a domain name service (DNS) name;

receiving, at the client application, a response from the relying party that includes authentication metadata that includes an address for a security token service (STS) trusted by the relying party and a security realm of the relying party;

sending, from the client application, a request for a security token to access the relying party to the STS;

receiving, at the client application, the security token from the STS and a public certificate for the relying party, wherein the security token comprises a SSL certificate for the relying party;

validating the SSL certificate through an authentication process that comprises comparing the SSL certificate for the relying party and the public certificate for the relying party; and upon successful validation of the security token, communicating, from the client application, the security token to the relying party.

16. The method of claim 15, wherein the validation comprises determining that one or more designated fields in the SSL certificate for the relying party match one or more designated fields in the public certificate for the relying party.

17. The method of claim 16, wherein a designated field is a certificate signature.

18. The method of claim 15, wherein the authentication process does not include a step of comparing the Internet Protocol (IP) address of the relying party to the subject field in the SSL certificate for the relying party.

19. The method of claim 15, wherein the method further comprises:

determining that the URI of the relying party does not match the subject field in the SSL certificate for the relying party;

determining that the request is addressed to an Internet Protocol (IP) address rather than a DNS name; and using the authentication process rather than a default authentication process that requires the URI of the relying party to match the subject field or subject alternative name (SAN) in the certificate for the relying party.

20. The method of claim 15, wherein the security token comprises a claim for the user of the client application.

* * * * *